(12) United States Patent
Uratani et al.

(10) Patent No.: US 9,098,782 B2
(45) Date of Patent: Aug. 4, 2015

(54) DATA PROCESSING APPARATUS AND DATA PROCESSING METHOD

(71) Applicant: CANON KABUSHIKI KAISHA, Tokyo (JP)

(72) Inventors: Mitsuru Uratani, Kawasaki (JP); Yuki Ishida, Kawasaki (JP); Yuki Omagari, Tokyo (JP); Yutaka Hiyama, Yokosuki (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/759,856

(22) Filed: Feb. 5, 2013

(65) Prior Publication Data

US 2013/0222859 A1    Aug. 29, 2013

(30) Foreign Application Priority Data

Feb. 29, 2012    (JP) .................. 2012-043621

(51) Int. Cl.
| | |
|---|---|
| *H04N 1/40* | (2006.01) |
| *G06K 15/02* | (2006.01) |
| *H04N 1/00* | (2006.01) |
| *H04N 1/60* | (2006.01) |
| *G06K 1/00* | (2006.01) |

(52) U.S. Cl.
CPC .......... *G06K 15/027* (2013.01); *H04N 1/00023* (2013.01); *H04N 1/00031* (2013.01); *H04N 1/00034* (2013.01); *H04N 1/00045* (2013.01); *H04N 1/00092* (2013.01); *H04N 1/6033* (2013.01)

(58) Field of Classification Search
USPC .................. 358/3.24, 1.9; 347/15, 19, 43
See application file for complete search history.

(56) References Cited

U.S. PATENT DOCUMENTS

| | | | |
|---|---|---|---|
| 6,419,340 B1 * | 7/2002 | Wickham et al. ............... | 347/15 |
| 8,649,056 B2 * | 2/2014 | Kobayashi ..................... | 358/1.9 |
| 2005/0219577 A1 * | 10/2005 | Edge .............................. | 358/1.9 |
| 2012/0206743 A1 * | 8/2012 | Murakami ...................... | 358/1.9 |

FOREIGN PATENT DOCUMENTS

JP    5-24224    2/1993

* cited by examiner

*Primary Examiner* — Quang N Vo
(74) *Attorney, Agent, or Firm* — Fitzpatrick, Cella, Harper & Scinto

(57) ABSTRACT

According to the invention it is possible to determine in advance whether it is possible to correctly generate a conversion table for calibration or color profile correction even with respect to an unknown print medium, and to avoid the preparation of unsuitable parameters and the performance of unsuitable image processing based thereon. In order to achieve this the color of a subject print medium is measured and from the color measurement result it is determined, based on color measurement data from a test pattern printed on the print medium, whether it is possible to obtain parameters suited to the print medium. As a result it has become possible to avoid the preparation of unsuitable parameters to be associated with the print medium, and it has become possible to output images with a comparatively stable reproduction of color even where performing printing on a variety of print mediums.

17 Claims, 10 Drawing Sheets

| TYPE | WEIGHT (g/m²) | PRINT MEDIUM NAME |
|---|---|---|
| NORMAL PAPER (PAPER BASE) (NO COATING) | 65 | NORMAL PAPER A |
| | 70 | NORMAL PAPER B |
| | 80 | NORMAL PAPER C |
| COATED PAPER (PAPER BASE) (COATING PRESENT) | 90 | COATED PAPER A |
| | 105 | COATED PAPER B |
| | 140 | COATED PAPER C |
| GLOSSY PAPER (RESIN BASE) (COATING PRESENT) | 120 | GLOSSY PAPER A |
| | 160 | GLOSSY PAPER B |
| | 195 | GLOSSY PAPER C |

| | MEASUREMENT VALUE | | |
|---|---|---|---|
| | L* | a* | b* |
| BLANK REGION (901) | 94.29 | 0.75 | -0.29 |
| | 94.20 | 0.75 | -0.41 |
| | 94.34 | 0.78 | -0.41 |
| | 94.36 | 0.76 | -0.42 |
| | 94.33 | 0.77 | -0.40 |
| AVERAGE | 94.30 | 0.76 | -0.39 |
| STANDARD DEVIATION | 0.06 | 0.01 | 0.05 |
| PATCH REGION (902) | 6.27 | 1.10 | -0.08 |
| | 6.41 | 0.94 | 0.01 |
| | 5.86 | 1.02 | -0.13 |
| | 6.19 | 1.00 | 0.06 |
| | 5.98 | 1.00 | -0.07 |
| STANDARD DEVIATION | 0.22 | 0.06 | 0.08 |

FIG.10B

| | MEASUREMENT VALUE | | |
|---|---|---|---|
| | L* | a* | b* |
| BLANK REGION (901) | 96.20 | -0.48 | 1.50 |
| | 96.19 | -0.47 | 1.55 |
| | 96.07 | -0.49 | 1.52 |
| | 96.06 | -0.45 | 1.61 |
| | 96.05 | -0.42 | 1.59 |
| AVERAGE | 96.11 | -0.46 | 1.55 |
| STANDARD DEVIATION | 0.07 | 0.03 | 0.05 |
| PATCH REGION (902) | 15.68 | -0.46 | -1.50 |
| | 16.31 | -0.25 | -1.16 |
| | 15.60 | -0.40 | -1.61 |
| | 16.73 | -0.32 | -1.11 |
| | 16.66 | -0.32 | -1.36 |
| STANDARD DEVIATION | 0.53 | 0.08 | 0.21 |

FIG.10C

| | MEASUREMENT VALUE | | |
|---|---|---|---|
| | L* | a* | b* |
| BLANK REGION (901) | 92.44 | 0.49 | 69.95 |
| | 92.46 | 0.67 | 70.07 |
| | 92.50 | 0.61 | 67.64 |
| | 92.41 | 0.52 | 68.97 |
| | 92.51 | 0.42 | 68.39 |
| AVERAGE | 92.46 | 0.54 | 69.00 |
| STANDARD DEVIATION | 0.04 | 0.10 | 1.03 |
| PATCH REGION (902) | 21.73 | 1.11 | 4.15 |
| | 22.06 | 1.14 | 4.37 |
| | 22.34 | 1.06 | 4.73 |
| | 21.63 | 1.09 | 4.04 |
| | 21.71 | 1.15 | 4.08 |
| STANDARD DEVIATION | 0.30 | 0.04 | 0.29 |

DATA PROCESSING APPARATUS AND DATA PROCESSING METHOD

BACKGROUND OF THE INVENTION

1. Field of the Invention

The invention relates to printing apparatuses and printing systems that are capable of performing calibration and preparing new color profiles for print mediums that were not intended for printing in advance.

2. Description of the Related Art

In recent times printing apparatuses and printing systems have been offered that perform calibration for print mediums that were not intended for printing in advance and generate new color profiles therefor, in order to output images having stable density and coloring on a variety of types of print mediums. Such a printing apparatus or printing system prints a prescribed pattern on such print medium, measures the color of the pattern using a color measurement device, and performs calibration and generates a color profile based on the color measurement result.

The calibration in the specification herein is a function for stabilizing the image density expressed on a print medium regardless of the type of print medium. In order to achieve this, for example, input signal values are converted to a lower level in the case of a print medium for which the density has a propensity to be expressed high, and input signal values are converted to a higher level in the case of a print medium for which the density has a propensity to be expressed low. In order to perform such conversion processing a 1D conversion table, in which suitable correction output signals (C'M'Y'K') are associated with the respective input signals corresponding to each ink color (CMYK), is prepared for each print medium.

On the other hand, the color profile generation function in the specification herein is a process that applies a correction to the input signal values such that for every type of print medium the same chromaticity is expressed with respect to the same input signal combination (RGB). In order to perform such conversion processing a multivalue conversion table, in which suitable output signals (R'G'B') are associated with each of the input signals (RGB), is prepared for each print medium.

In order to create conversion tables with respect to both calibration and color profiles an operation is required in which a prescribed patch is printed on the target print medium, the color of the patch is measured, and the conversion table is generated according to the result of the color measurement.

Here, in the case where a printing system performs printing only on selected types of print mediums, conversion tables may be made in advance that correspond to the various print mediums and stored in advance within the internal memory of the printing system. In recent times where various print mediums are offered, however, there are times where printing is also performed on print mediums that were not intended for printing in advance, and there is a risk it will not be possible to express the target density and the target chromaticity. If the printing system is provided with a color measuring device, however, even in the case where a new type of print medium is mounted it is possible to perform an operation wherein the above operation, that is, an operation in which a prescribed patch is printed on the print medium, the patch is measured, and a conversion table is generated according to the color measurement result. By way of using a newly generated conversion table, it becomes possible to express the target density and the target chromaticity on the print medium.

It is not the case, however, that the above described operation for generating a conversion table can be correctly performed for all print mediums. For example, color measurement results are often not stable for print mediums in which there is severe surface roughness and optical conditions cannot be held uniform, and for print mediums in which the lightness, chromaticity, and glossiness are not uniform on the surface. Thus a problem occurs wherein when a conversion table is generated based on such an unstable color measurement result it is not possible to perform a correction with a high degree of reliability and only an undesired color reproduction can be obtained.

Furthermore, in the case where the base color of a print medium has a high color saturation of hue such as yellow, although it is possible to perform a set of operations and to generate a conversion table, influence of the base color will be included in the color measurement result. Thus even if the generated conversion table is used it is difficult to suitably correct shifts of hue and saturation that are expressed on the print medium by applying ink, and there are cases where a mistaken reproduction of color occurs in the output image.

In order to prevent such an undesired color reproduction Japanese Patent Laid-Open No. H05-024224 (1993), for example, proposes a method of excluding print mediums that are not adaptable to the apparatus by way of the printer maker marking multiple types of print mediums in advance and reading the marks with a sensor. In the method of Japanese Patent Laid-Open No. H05-024224 (1993), however, there is a limit to the types of print mediums on which it is possible to apply a mark, and it is not possible to sufficiently handle unknown print mediums that a user has prepared on his or her own.

That is, before the invention disclosed herein, in an environment where various print mediums existed in the marketplace, it was not possible to reliably determine with respect to all print mediums whether or not it was possible to generate a correct conversion table for calibration and color profile correction.

SUMMARY OF THE INVENTION

The present invention was formed to solve the aforementioned problems of the prior art. In order to accomplish this purpose data processing apparatuses and data processing methods are provided in which it is possible to avoid the preparation of unsuitable parameters for calibration and color profile correction associated to an unknown print medium, and in which it is possible to output an image with a comparatively stable reproduction of color.

In a first aspect of the present invention, there is provided a data processing apparatus comprising: an obtaining unit configured to obtain a first measurement result by using a measuring unit to measure a region of a subject print medium at which printing materials are not applied; and a determination unit configured to determine whether or not correction data corresponding to the subject print medium is effective based on the first measurement result obtained by the obtaining unit, wherein the correction data is generated based on a second measurement result which is obtained by using the measuring unit to measure a region of the subject medium at which the printing materials are applied, and based on a target value corresponding to the region at which the printing materials are applied.

In a second aspect of the present invention, there is provided a data processing method comprising: an obtaining step for obtaining a first measurement result by using a measuring unit to measure a region of a subject print medium at which printing materials are not applied; and a determination step for determining whether or not correction data corresponding to the subject print medium is effective based on the first measurement result obtained by the obtaining step; wherein the correction data is generated based on a second measurement result which is obtained by using the measuring unit to measure a region of the subject medium at which the printing materials are applied, and based on a target value corresponding to the region at which the printing materials are applied.

Further features of the present invention will become apparent from the following description of exemplary embodiments (with reference to the attached drawings).

BRIEF DESCRIPTION OF THE DRAWINGS

FIG. 6 is a chart that illustrates types of print medium and weight information;

FIGS. 10A to 10C are charts that illustrate an example of a color measurement result.

DESCRIPTION OF THE EMBODIMENTS

Figure 1A:
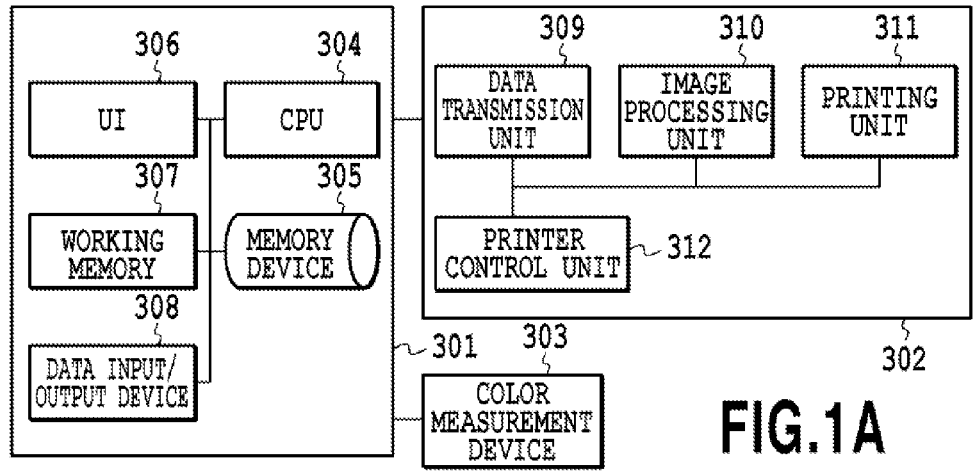
FIGS. 1A to 1C are drawings that illustrate examples of control structures capable of being used with the printing system of the invention.

A preferred embodiment of the invention will be described below while referring to the drawings.

Figure 1B:
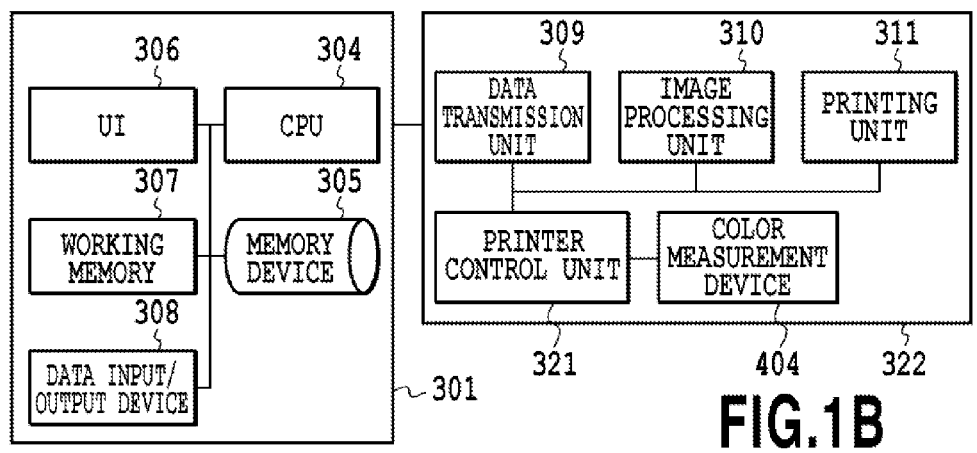
Figure 1C:
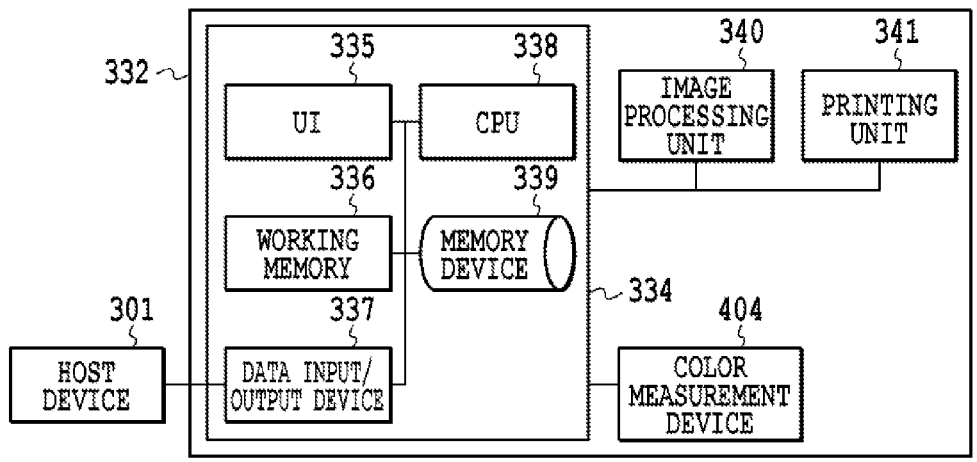

FIGS. 1A to 1C are diagrams that illustrate examples of control structures capable of being used in the inkjet printing system of the current embodiment. FIG. 1A illustrates an image printing system in which a printing apparatus 302 and a color measurement device 303 are independently connected to a host device 301, while FIG. 1B illustrates are configuration where a color measurement unit 323 is provided within a printing apparatus 322. FIG. 1C illustrates an image printing system in which the host device 301 functions only to supply images and all of the characteristic processes of this invention are executed within the printing apparatus 332. The image printing system of this embodiment may be applied to each of the configurations illustrated in FIGS. 1A to 1C, but the herein the functions of each of the blocks will be explained based on FIG. 1A as an example.

The host device 301 executes print control instructions to the printing apparatus 302, the transmission of necessary information and data, color measurement control instructions to the color measurement device 303, and procurement and storage of color measurement values. This set of functions is administered by the CPU 304. At the memory device 305 memory management is performed with respect to system programs for the current embodiment such as an OS, a variety of parameters and color measurement values necessary to be set in advance for the invention, and parameter data necessary for a variety of application software and a variety of processes. The memory device 305 can be structured by means typified by hard discs and flash ROM.

The CPU 304 implements the aforementioned software stored in the memory device 305 using working memory 307. That is, when the invention is implemented, the CPU 304, based on the software programs, executes control over each of the steps in the explanation below based on command instructions from each structural unit and the performance of information transmission.

The operation unit 306 (hereinafter also referred to simply as the "UI"), which is a user interface, performs processes related to user input and output concerning the execution of the aforementioned processes, and includes inputs devices such as a keyboard and a mouse, and indication devices such as a display. Through the operation unit 306 the user inputs parameters necessary for the invention and generates commands, and is capable of obtaining system information through the indication device.

The color measurement device 303 is connected to the host device 301 through an interface such as a network, an USB or a local bus. The color measurement device 303 is equipped with a sensor capable of obtaining L*a*b data, measures the color of a prescribed test chart printed by the printing apparatus 302 according to an instruction from the host device 301, and transmits the result to the host device 301. The color measurement device 303 of the current embodiment can be made, for example, a general purpose spectral reflectance measuring apparatus such as model i1 Pro or model i1 iSIS, made by the X-Rite Corporation (America).

The printing apparatus 302 is provided with a data transmission unit 309, a printer control unit 312, an image processing unit 310, and a printing unit 311. The print data output by the host device 301 is received by the data transmission unit 309. The print data is comprises, for example, image data, image processing parameters, mechanical parameters and color measurement device parameters, associated with the print medium. The data transmission unit 309 fetches out image data and image processing parameters from the print data sent from the PC 301 and transmits it to the image processing unit 310, and transmits mechanical parameters and color measurement parameters to the printer control unit 312. The printer control unit 312 executes conveyance and carriage operations of the printing apparatus 302, and the setting of the color measurement device, etc.

The printing unit 311 comprises a print head that ejects ink and a driver therefor, and executes an ink ejection operation according to image data to which a set of image processes has been applied at the image processing unit 310.

Each of the blocks at FIGS. 1B and 1C has the same function as the respective blocks at FIG. 1A. At FIG. 1B, however, the color measurement unit 323, which serves the purpose of measuring color, is provided within the printing apparatus 322. Here, control of the color measurement unit 323 is performed by the printer control unit 321 within the printing apparatus 322.

Furthermore, at FIG. 1C, the functions encompassing the function blocks of the host device 301 of FIGS. 1A and 1B reside within the printing apparatus 332 as computing unit 334. Thus in the case of FIG. 1C the computation unit 334, in substitution for the printer control units 312 and 321 of FIGS. 1A and 1B, executes the control of the printing apparatus 332 and the color measurement unit 333.

At FIG. 1C the data input and output apparatus 337 comprises a portable recording device typified by a CD or a MO, and a data transmission device such as a LAN card. The data input and output apparatus 337 is used as an interface when data intended for printing and correction process execution commands are received from another host device 301. Here, if the input of data intended for printing is performed through the portable recording device and the correction process and usual printing execution commands are specified via the UI 335, the host PC 301 is not required because processing is completed by the output apparatus 332 only.

The printing system of the invention can be adopted in any of the configurations illustrated at FIGS. 1A to 1C. In the case of FIG. 1A the system including the host device 301, the printing apparatus 302, and the color measurement device 303 comprises the printing system of the invention. In the case of FIG. 1B the system including the host device 301 and the printing apparatus 322, which includes the color measurement device 404, comprises the printing system of the invention. In the case of FIG. 1C the printing apparatus 332, which includes the computation unit 334 and the color measurement unit 404, comprises the printing system of the invention. The explanation will be continued below using the printing system having the configuration at FIG. 1A as an example.

Figure 2:
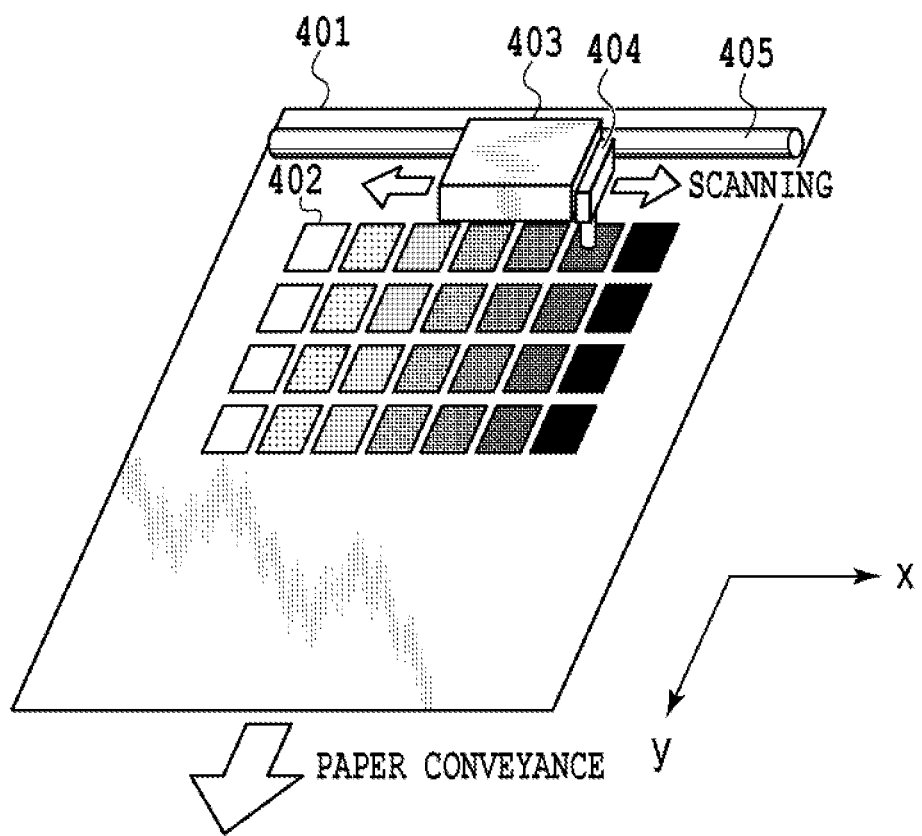
FIG. 2 is a drawing for schematically explaining the printing operation executed by a printing unit.

FIG. 2 is a diagram for schematically explaining the printing operation executed by the print unit 311 (or 341) of this embodiment. The carriage 403, on which the print head is mounted, moves in the x direction of the figure while being guided and supported by the carriage axis 405, and during this movement the print head ejects ink, which is the print material and is applied onto the print medium 401. An image in accordance with the image data, is incrementally formed on the print medium 401 by alternatingly repeating such print scans by the print head in the x direction and conveyance operations that convey the print medium in the y direction. Note that in FIG. 2 the sensor 404, which performs color measurement, is disposed at the edge of the carriage 403, while FIGS. 1B and 1C illustrate a configuration in which the color measurement unit 404 is deployed within the printing apparatus.

Figure 3:
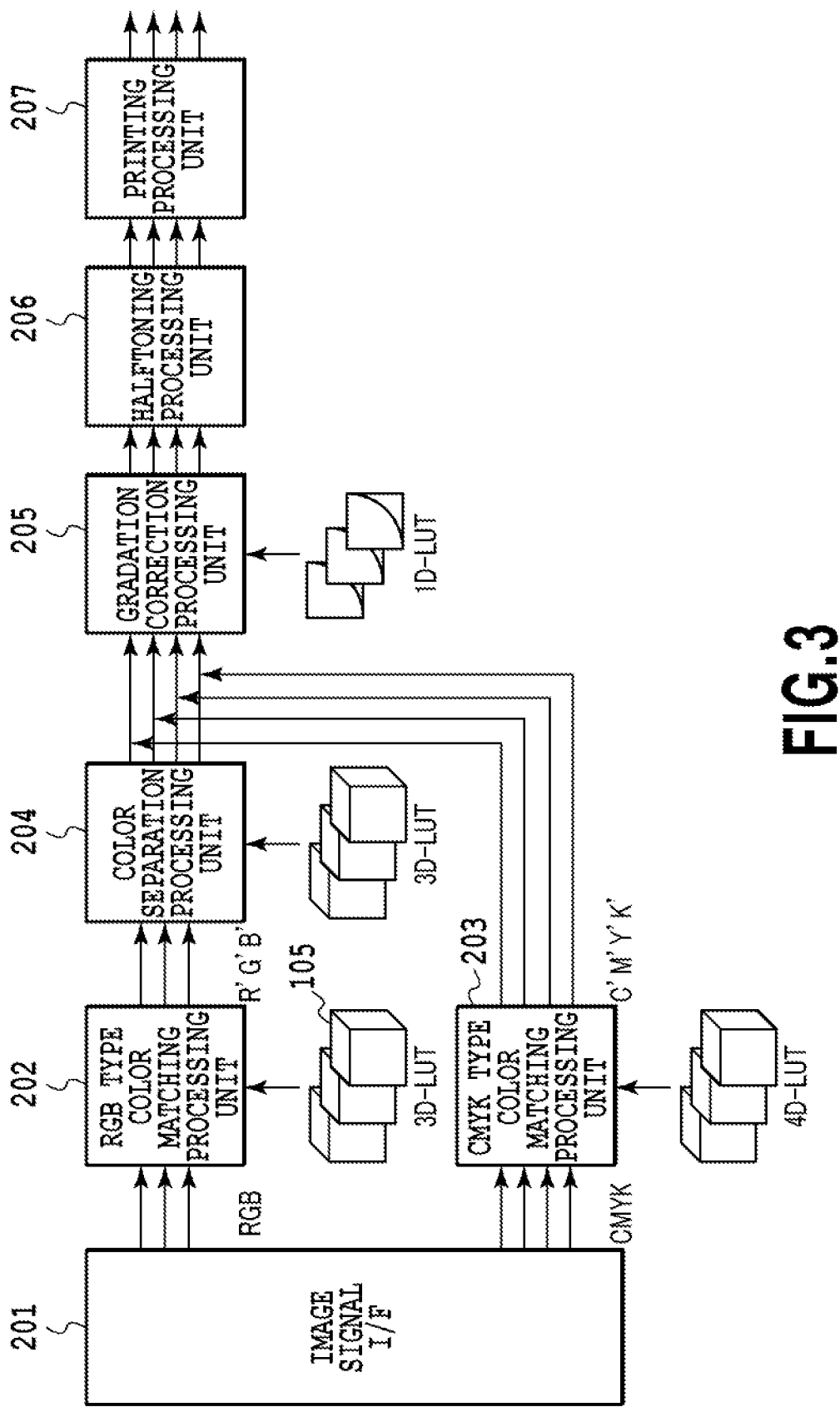
FIG. 3 is a block diagram that illustrates the image processing steps that a printing system executes at an image processing unit.

FIG. 3 is a block diagram that illustrates the image processing steps that the printing system of the current embodiment executes at the image processing unit 310 or 340. The image processing unit receives image data through the image signal I/F 201. This image data is either a RGB signal comprising red, green and blue brightness signal values, or a CMYK signal comprised of cyan, magenta, yellow and black, and both comprise a multivalue signal on the order of 8 bits.

In the case where the input signal is an RGB signal, in the RGB type color matching processing unit 202 the RGB color space, which does not depend on the printing apparatus, is converted to a R'G'B' color space that is dependent on the printing apparatus of the current embodiment. Thereafter, at the color separation processing unit 204, it is color converted to a CMYK signal that corresponds to the ink colors used by the printing apparatus. At both the RGB type color matching processing unit 202 and the color separation processing unit 204, a 3D lookup table, which has been prepared in advance, is referenced, and the respective RGB or R'G'B' is converted to corresponding R'G'B or CMYK data based on the table.

On the other hand, in the case where the input signal is a CMYK signal, in the CMYK type color matching processing unit 203 the CMYK color space, which does not depend on the printing apparatus, is converted to a C'M'Y'K' color space that is dependent on the printing apparatus of the current embodiment, as expected. At the CMYK type color matching processing unit 203 a 4D lookup table, which has been prepared in advance, is referenced, and the CMYK is converted to corresponding C'M'Y'K'.

Thereafter, the output signal CMYK from the color separation processing unit 204, and the output signal C'M'Y'K' from the CMYK type color matching processing unit 203 are input to the gradation correction processing unit 205. At the gradation correction processing unit 205 linear conversion is performed for each color such that the printing density expressed on the print medium and the input signal can have a linear relationship. Here, 1D lookup tables that have been prepared for each color are referenced at the gradation correction processing unit 205. Note that the signal value conversions that are performed at the RGB type color matching processing unit 202, the CMYK type color matching processing unit 203, the color separation processing unit 204, and the gradation correction processing unit 205, are all performed with 8-bit multivalue signals.

Multivalue data, to which gradation correction processing has been applied, is input to the halftoning processing unit 206, and with respect to each ink color, it is converted into binary data that denotes the printing of a dot (1) or nonprinting (0). Thereafter the binary data is sent to the printing unit 207 (311, 341) and from the print head an ejection operation is performed according to the data.

Note that, regarding the lookup tables that are referenced by the RGB type color matching processing unit 202, the CMYK type color matching processing unit 203, the color separation processing unit 204, and the gradation correction processing unit 205, a plurality of each are generally prepared according to the type of print medium and print mode. This is because even in the case where printing has been performed using the same ink, the expressed color space and the linear relationship between the input signal and the image density varies according to the print medium. Furthermore, outside of image processing as well, there are many cases where the handling of the print medium differs according to the type of print medium. Thus, as is the case with parameters that set conveyance conditions, the current embodiment is also a means of preparing and storing, for each print medium, mechanical parameters that denote the handling of the print medium.

Figure 4:
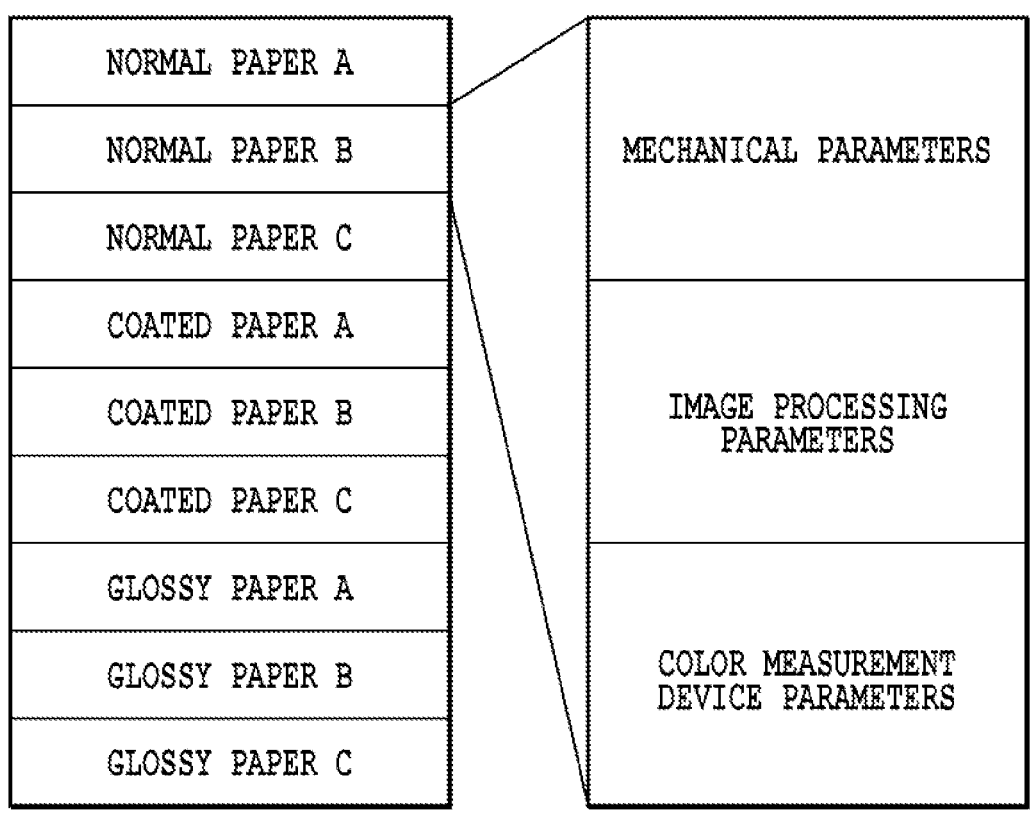
FIG. 4 is a diagram that illustrates the state in which a printing system manages in memory the parameters for each print medium.

FIG. 4 is a diagram that illustrates the state in which the printing system of the current embodiment manages in memory the parameters for each print medium. Here, as one example, plain paper A to C, coated paper A to C, and glossy paper A to C are registered in advance as prescribed print mediums, and the state in which parameters for each of the print mediums is managed is illustrated. Mechanical parameters, image processing parameters and color management device parameters are prepared for each of the print mediums. Here, a parameter for setting the amount of rotation of the conveyance motor that conveys the print mediums in the y direction, and a parameter for adjusting the height of the print head according to the thickness of the print mediums, etc. are included as mechanical parameters. The lookup tables that are referenced when each of the conversion processes that were explained at FIG. 3 are executed correspond to the image processing parameters. Parameters that specify the necessity of a UV cut filter when performing color measurement, and that specify whether color measurement data can be used or not, for example, are included as color measurement device parameters. A detailed explanation will be made below with respect to the color measurement data usability parameter.

In the printing system of the current embodiment, parameters such as the above 3 types are stored in memory and managed, for each type of print medium. When registering a new print medium outside of the print mediums that are stored in advance a new memory region is reserved at an area that is different than the above regions, and here memory management is performed for the mechanical parameters, the image processing parameters, and the color management device parameters for the new print medium.

Figure 5:
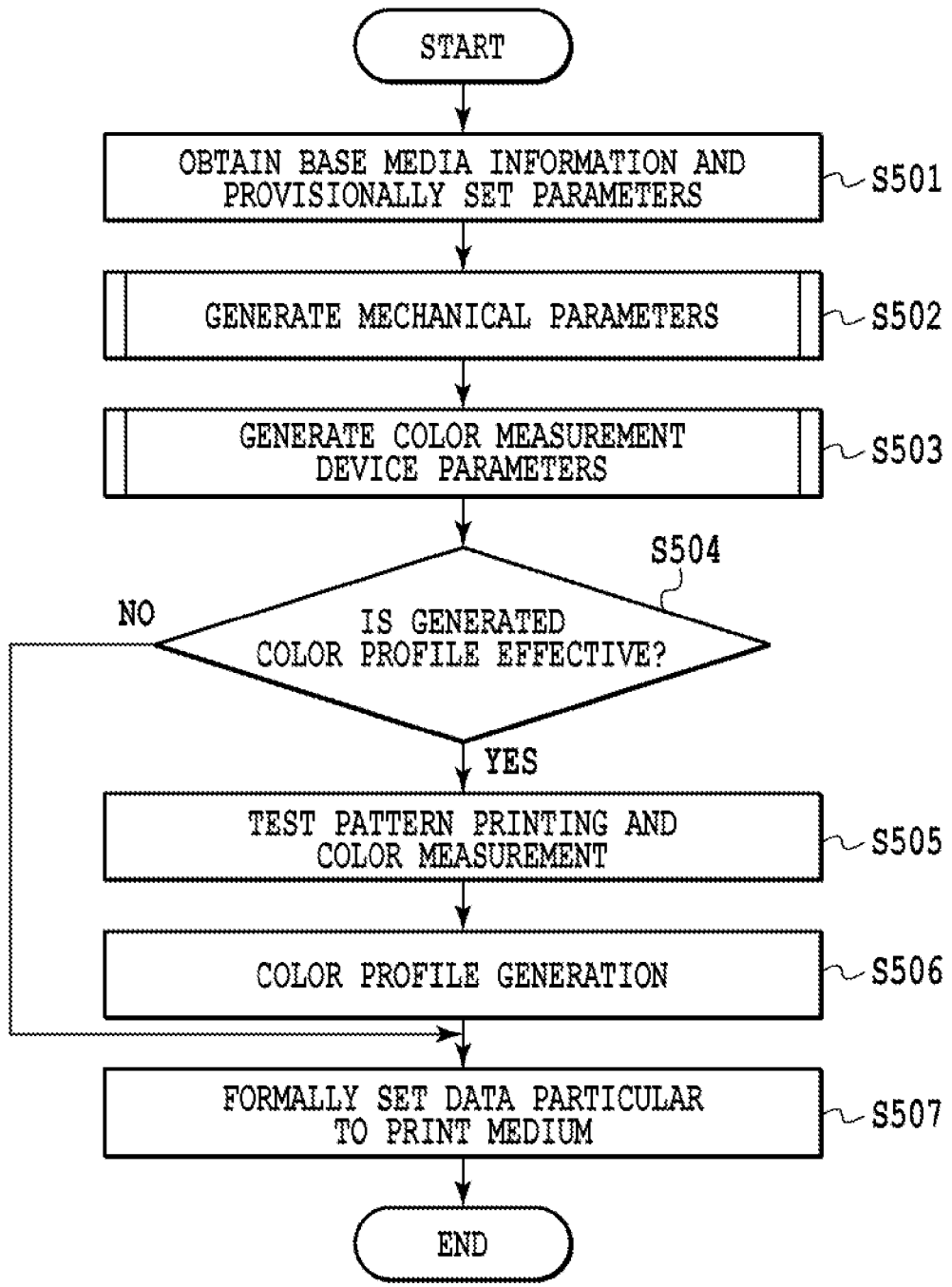
FIG. 5 is a flowchart for explaining the processing steps when registering a new print medium.

FIG. 5. is a flowchart for explaining the processing steps that are executed by the CPU when registering a new print medium in the printing system of the current embodiment. Here, as one example, explanation will be made concerning a function that generates a color profile, which is correction data for adjusting the mixture balance of multiple ink colors. This process begins with a user setting a print medium that the user desires to newly register in the printing apparatus, and entering a color profile generation command at the UI 306.

When the current process is commenced, first, at step 501, the CPU 304 receives similar print medium type information from the UI 306, and each type of parameter is provisionally set for the print medium that is desired to be newly registered. Explained more specifically, first, the user selects from a pull-down menu of the UI 306 a print medium that is similar to the print medium that the user desires to newly register as the base medium, from among the print mediums that have already been registered.

FIG. 6 is a chart that illustrates the types of print mediums already registered and weight per unit area information. This type of information can be held by the user as previous knowledge, or the information stored in the memory device 305 may be displayed through the UI 306 via a help function. Here, if the print medium that the user desires to newly register is assumed, for example, to be coated paper having resin as the base material and a weight of 150 g/m², the user can select "Glossy Paper B" as the base print medium from the table shown at FIG. 6. The CPU 304 receives such base media setting, and reserves a memory region for the print medium that the user wishes to newly register as "Glossy Paper D".

Figure 7:
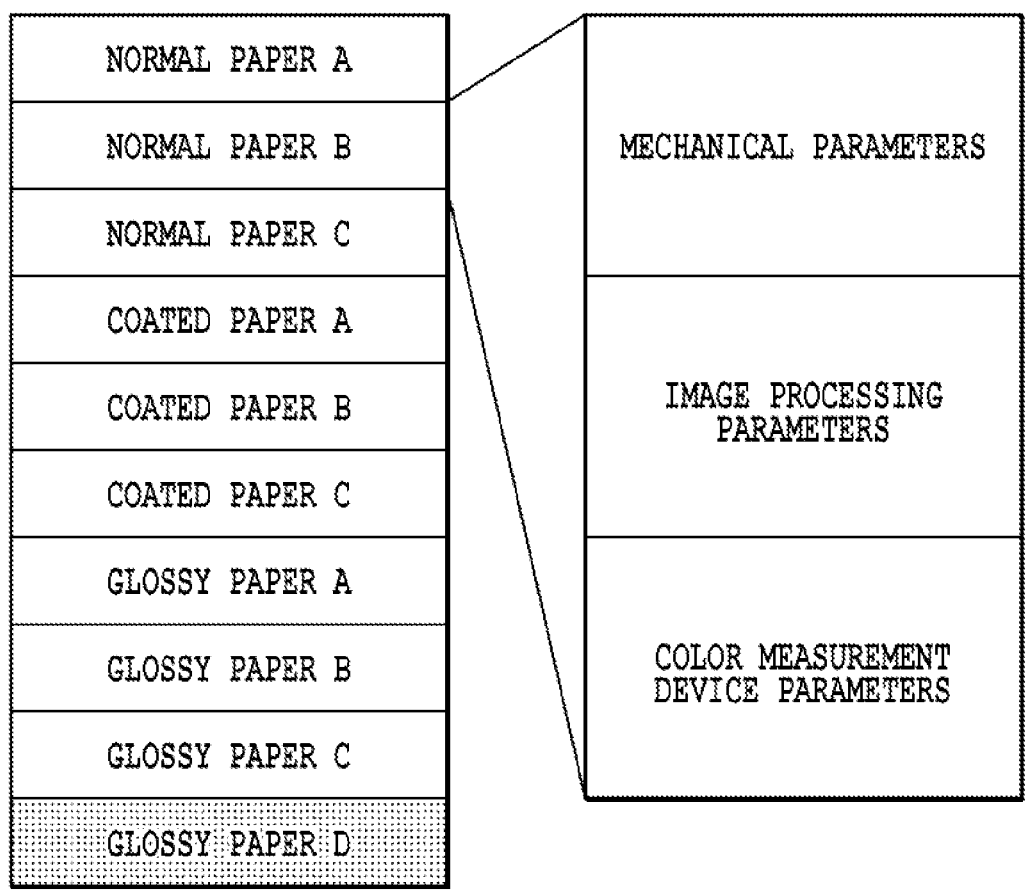
FIG. 7 is a drawing that illustrates a state in which parameters for each print medium are managed in memory.

FIG. 7 is a diagram that illustrates the state in which parameters for each print medium are managed in memory, where the CPU 304 has reserved a memory region for "Glossy Paper D". In comparison with FIG. 4, in addition to the 9 types of print mediums already registered, a memory region for "Glossy Paper D" has been provided, similarly to the other print mediums. The CPU 304 copies and provisionally sets the mechanical parameters, the image processing parameters, and the color measurement device parameters of "Glossy Paper B" to the respective regions that store the mechanical parameters, the image processing parameters, and the color measurement device parameters for "Glossy Paper D".

At step S502 the CPU performs the generation of mechanical parameters for Glossy Paper D. Specifically, the print medium that has been set is fed, a prescribed test pattern is printed for feed adjustment while using the provisionally set "Glossy Paper B" parameter, and the test pattern is detected. Based on the result of the measurement a mechanical parameter for the "Glossy Paper D" is newly computed, and is stored at the mechanical parameter region for "Glossy Paper D." Note that because pattern storage, detection and computation methods for obtaining mechanical parameters are well known in the art and are not a characteristic of the invention, the corresponding detailed explanations have been omitted here.

At the following step S503 the CPU performs the generation of color measurement device parameters for "Glossy Paper D."

Figure 8:
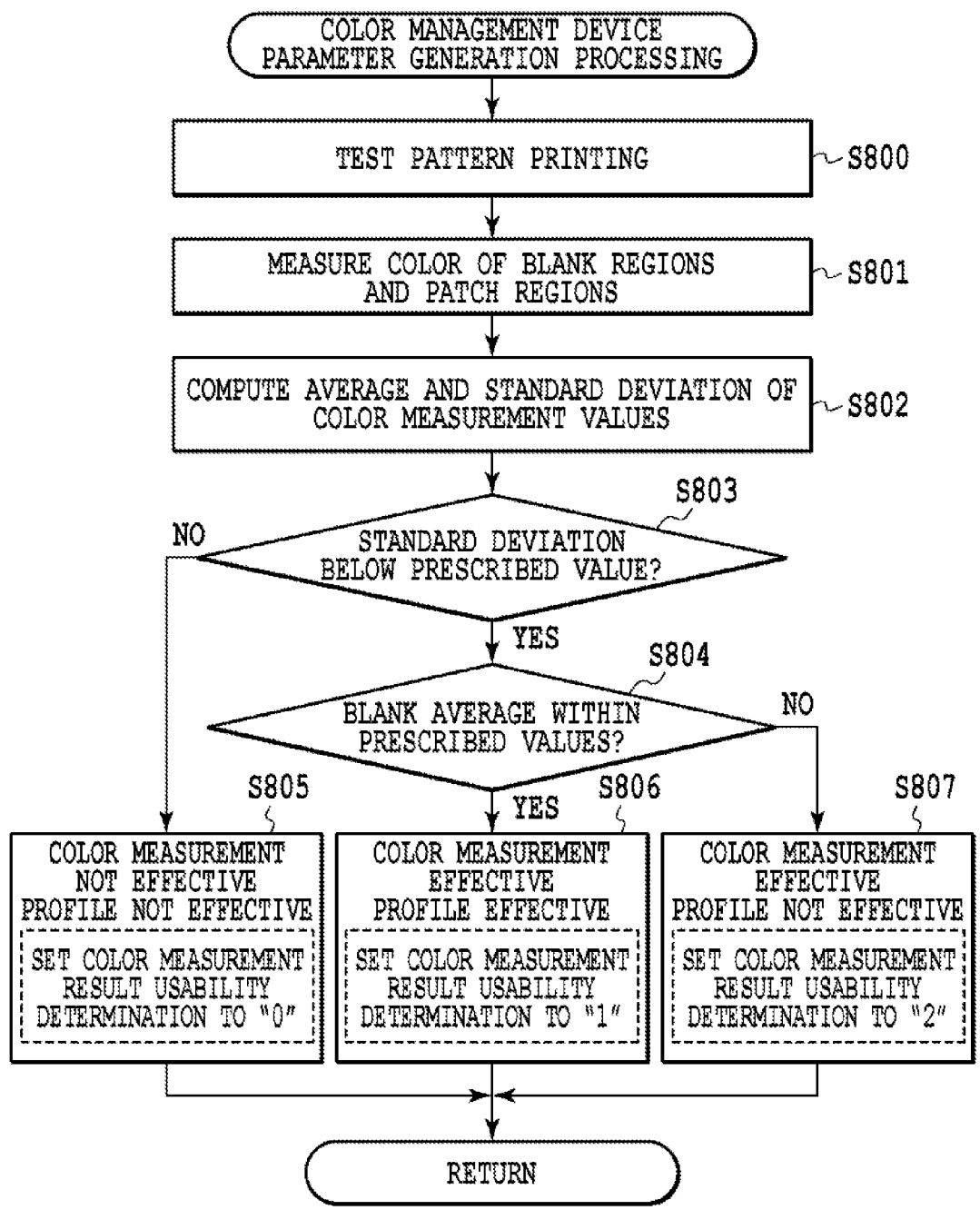
FIG. 8 is a flowchart for explaining the generation process for color generation device parameters.

FIG. 8 is a flowchart for explaining the generation process for the color measurement device parameters, which is executed at step S503. When the current process is started, the CPU 304 first at step S800 feeds the set print medium, and prints a prescribed test pattern for determining the usability of the measured color data while using the presently set "Glossy Paper D" parameters.

Figure 9:
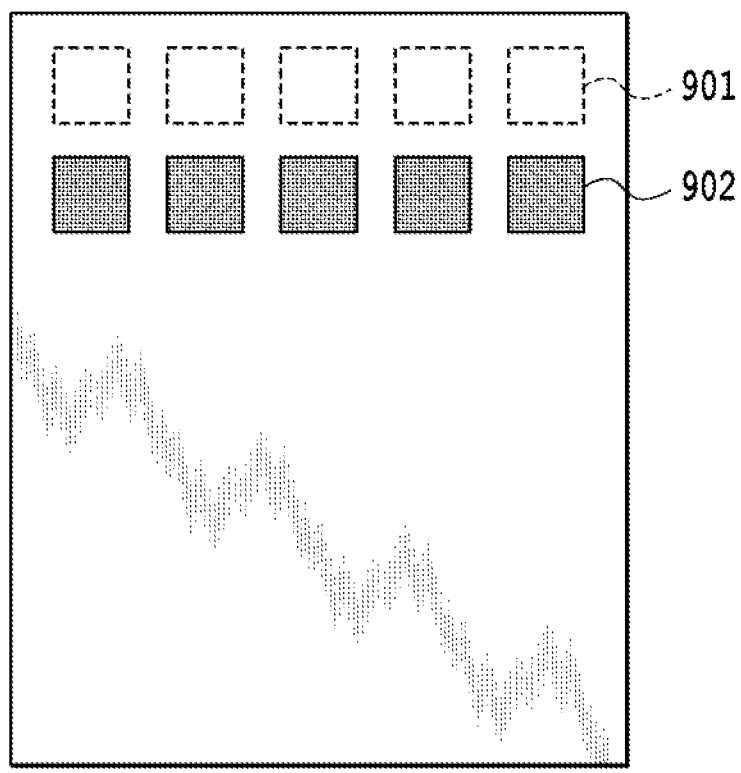
FIG. 9 is a drawing that illustrates an example of a test pattern for the usability of a color measurement result.

FIG. 9 is a drawing that illustrates an example of the aforementioned test pattern. Blank regions 901, at which ink is not applied, are provided, and a plurality of patches 902 are printed at a prescribed print density. The patches 902 can be made, for example, cyan, magenta, yellow and black, with each pattern printed at a print density of 20%. In the present invention, however, patches accompanying such an application of ink are not necessarily required. Because the operation at step S503 is an operation for determining whether or not color measurement is suitably performed using the subject print medium, in the case where determination is possible based on color measurement of only the blank regions 901 where ink is not applied on the print medium, it is acceptable that the patches 902 are not printed. In this case step S800 comprises a feeding operation of the print medium only.

At step 801 the CPU 304 performs a color measurement of each of the plurality of patch regions and the plurality of blank regions of the test pattern shown at FIG. 9, using the color measurement device 303. Next, average values and standard deviations are computed with respect to each of the blank regions and patch regions, and are temporarily stored.

FIGS. 10A to 10C are charts that illustrate examples of measurement result that are gained and recorded at step S801. FIG. 10A illustrates the color measurement result for a comparatively general glossy paper, FIG. 10B illustrates the color measurement result for a canvas with roughness on the surface, and FIG. 10C illustrates the color measurement result for a print medium that has a comparatively bright tinge of yellow in its base color.

In the case of a canvas print medium having roughness on the surface, it can be understood that the standard deviation of the L* (lightness) is large in comparison to the other print mediums at both the blank regions and the patch regions. This is thought to be due to the fact that because there is roughness on the surface of the print medium dispersion of incident light rays varies depending upon location, and that there is a large variance in the amount of received light in comparison to other print mediums. For this type of print medium the measured colored value result is not stable, and this result is unreliable as well.

On the other hand, for the case of the print medium that has a tinge of yellow, it can be understood that the average values of a* and b* at the blank regions deviate largely from than that of the other print mediums. This means that a chromaticity that is not 0 is already present in the blank regions. In the case of such a print medium influence of the base color is included in the measured color result of the patch regions, and it is difficult to determine the influence of having applied ink on the print medium on the hue and saturation. As a result even after having color measured patches printed on such a print medium it is not possible to suitably generate a color profile for correction the influence on hue and color saturation caused by the application of ink.

As discussed above in the current embodiment it is possible to determine that the color measurement data from having measured the color of a print medium such as that of FIG. 10B and a print medium such as that of FIG. 10C, and the color profile generated using that measured color data, are not effective. Because of this, first, at step S803 the CPU 304 determines whether or not the standard deviation computed at step 802 is equal to or above a specified value. Explained more specifically, in the current example it is determined whether or not the standard deviation of the L* value of the color measurement result is less than a threshold of 0.5. In the case where the standard deviation of the L* value is less than 0.5 it is determined that the measured data is effective and the process proceeds to step S804. On the other hand, in the case where the standard deviation of the L* value is equal to or less than 0.5 it is determined that the measured data is not effective and the process proceeds to step S805. Next, at step S805, "0" data, which denotes that the color measurement data is not effective and that the color profile generated using the color measurement data is also not effective, is set as the color measurement data usability determination information of the color measurement device parameter. In the case of a print medium where a result such as that of FIG. 10B is obtained, "0" is set as the color measurement data usability determination information of the color measurement device parameter.

On the other hand, at step S804 the CPU 304 determines whether or not the L*a*b* average value calculated at step 802 satisfies prescribed conditions. Specifically, it is determined whether or not the L*a*b* average value satisfies the conditions: (i) L*>80, (ii) −5<a*<5, and (iii) −15<b*<5. In the case where the above conditions are satisfied it is determined that the measurement data is effective and that the color profile generated using the measurement data is also effective, and the process proceeds to step 5806. Next, at step 806, "1" data, which denotes that the measurement data is effective and that the color profile generated using the measurement data is also effective, is set as the color measurement data usability determination information of the color measurement device parameter. In the case of a print medium where a result such as that of FIG. 10A is obtained, "1" is set as the color measurement data usability determination information of the color measurement device parameter.

On the other hand, in the case where the average value of L*a*b* does not satisfy the above conditions it is determined that the measurement data is effective, but it is determined that the color profile generated using the measurement data is not effective, and the process proceeds to step S807. At step S807 "2" data, which denotes that the measurement data is effective but that the color profile generated using the measurement data is not effective, is set as the color measurement data usability determination information of the color measurement device parameter. In the case of a print medium where a result such as that of FIG. 10C is obtained, "2" is set as the color measurement data usability determination information of the color measurement device parameter. When the color measurement data usability determination information associated with the print medium is set at step s805 to step s807, the current process is terminated and we return to the flowchart of FIG. 5.

Referring again to FIG. 5, at step 504 the color measurement data usability determination information of the color measurement device parameter stored at step S503 is confirmed, and it is determined whether or not the color profile generated for the "Glossy Paper D" is effective. Specifically, in the case where the color measurement data usability determination information is "1," it is determined that the color profile is effective and the process proceeds to step S505, and in the case where the color measurement usability determination information is "0" or "2," it is determined that the color profile is not effective and the process jumps to step S507.

At step S505 the set print medium is fed and while using the present parameter for "Glossy Paper D" a prescribed test pattern, which is for the generation of a color profile and contains a plurality of patches, is printed. Here, the present parameter of the "Glossy Paper D" is the parameter set at step S502 with respect to the mechanical parameter. The image processing parameter is the parameter of the "Glossy Paper B" provisionally set at step S501. Specifically, while referring again to FIG. 3, a number of patches are prepared that have prescribed RGB data, these bypass only the color matching unit 202, and printing is performed after the color separation process and the processes thereafter are completed using the Glossy Paper B parameters. The printed pattern appears such as that of FIG. 2, for example. Next, when the prescribed patch pattern has been printed it is color measured using the color measurement device 303. The measured color data is temporarily stored at the memory device 305.

At step S506 a color profile is generated based on the measured color data stored at step S505. A detailed explanation of the method of generating a lookup table from measured data has been omitted as it is well known in the art and not a characteristic element of the invention. The generated color profile, upon performing printing on the "Glossy Paper D," becomes the 3D lookup table referenced at the color matching unit 202.

At step S507 each type of parameter newly generated at the above steps is formally set, at the "Glossy Paper D" region of the memory device, as the particular parameter for "Glossy Paper D." Here, the color profile newly generated at step 506 is formally set with respect to a print medium for which it was determined at step S504 that a color profile was capable of creation. On the other hand, the color profile optimized for the "Glossy Paper B" is formally set for the "Glossy Paper D" with respect to a print medium for which it was determined at step S504 that a color profile was not capable of creation. With this the present process is completed.

According to the current embodiment described above, when performing printing on a new print medium that has not been registered, before generating parameters for the print medium it is possible to determine the effectiveness of its measured color data and the effectiveness of the color profile generated based on the measured color data. In other words, in the case of a print medium for which a suitable color profile cannot be generated, the processes at step S505 and step S506 are not performed, and it is possible to avoid a wasteful use of print medium and expenditure of time. When performing printing on such a print medium image processing is performed using the parameters formally set at step S507. At this time, in the case of a print medium with extreme roughness or a print medium having a base color of a high saturation, a color profile is not forcedly generated from measured color data with respect to the print medium, and image processing is performed using a color profile of a print medium that most closely resembles it.

That is, according to the current embodiment, such a color profile is generated only with respect to print mediums for which color measurement has been suitably performed and for which it has been determined that it is possible to generate a dedicated color profile with a high degree of reliability, and thereby it is possible to output an image having excellent color reproduction characteristics. With respect to print mediums for which color measurement has not been suitably performed and for which it has been determined that it is not possible to generate a dedicated color profile with a high degree of reliability, image processing is performed using the color profile of a similar print medium and it is possible to output an image with a stable color reproduction. As a result, even in the case of performing a printing on a new print medium, it is possible to avoid the preparation of unsuitable parameters to be associated with the print medium, and it has become possible to output images with a comparatively stable reproduction of color.

In the case where information input by a user and instructing the generation of a color profile has been received, color measurement data usability determination information corresponding to the print medium specified by the user is read out. In the case where the read out color measurement data usability determination information is "1" it is determined that a generated color profile would be effective. For this reason a color profile generation process is executed. On the other hand, in the case where the read out color measurement data usability determination information is "0" or "2" it is determined that a generated color profile would not be effective. In this case the user is notified through a notification means that a generated color profile would not be effective.

Note that while the case of generating a color profile referenced at the color matching unit 202 was explained above, the functionality of the current embodiment can naturally be applied to calibration as well. In this case, at step S505, upon the printing of a test pattern, image processing is performed bypassing the gradation correction processing unit 205, while the processes of the color matching processing uniting 202 and the color separation processing unit 204 are performed using present parameters. The patches printed as a test pattern may be patches of a plurality of gradations prepared for each ink color. The generated tables are not a multidimensional conversion tables, rather, these may be 1D conversion tables which are referenced by the gradation correction processing unit 205.

Furthermore, it is also possible to generate a color profile at the same time as calibrating. In this case, with respect to print mediums for which the color measurement data usability determination information is "2", for example, there are cases where even it is not possible to perform generation of a color profile that is influenced by hue, it is possible to perform calibrations that determine based on density only. In such a case, according to the color measurement data usability determination information, only 1D lookup tables referenced at the gradation correction processing unit are generated, and with respect to the color profile, it is acceptable to use data of a similar print medium as per the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-043621, filed Feb. 29, 2012, which is hereby incorporated by reference herein in its entirety.

What is claimed is:

1. A data processing apparatus comprising:
    an obtaining unit configured to obtain a first measurement result by using a color measuring unit to measure a region of a subject print medium at which printing materials are not applied; and
    a determination unit configured to determine whether or not a second measurement result should be obtained, based on the first measurement result obtained by the obtaining unit,
    wherein a correction data corresponding to the subject print medium is generated based on the second measurement result which is obtained after the first measurement result is obtained by using the measuring unit to measure a region of the subject medium at which the printing materials are applied, and based on a target value corresponding to the region at which the printing materials are applied.

2. The data processing apparatus according to claim 1, wherein the correction data is a multi-dimensional conversion table for adjusting an application amount balance of the printing materials of a plurality of colors to be printed on the subject print medium.

3. The data processing apparatus according to claim 1, wherein the correction data is a 1 dimensional conversion table for adjusting an application amount of the printing material to be printed on the subject print medium.

4. The data processing apparatus according to claim 1, wherein the first measurement result includes a plurality of measurement results which are obtained by measuring a plurality of regions of the subject print medium at which the printing materials are not applied, and wherein the determination unit determines whether or not a second measurement result should be obtained based on a standard deviation or an average value of the plurality of color measurement results.

5. The data processing apparatus according to claim 1, further comprising:
    a receiving unit configured to receive, from a user, information instructing generation of the correction data corresponding to the subject print medium; and
    a generation unit configured to generate the correction data in a case where the receiving unit receives the information and the determination unit has determined that the second measurement result should be obtained.

6. The data processing apparatus according to claim 1, further comprising a notification unit configured to notify, to a user, information indicating that the correction data is not effective, in a case where the determination unit has determined that the second measurement result should not be obtained.

7. The data processing apparatus according to claim 5, further comprising a recordation unit configured to record the correction data generated by the generation unit associating the correction data with the subject print medium.

8. The data processing apparatus according to claim 1, further comprising a recordation unit which records correction data corresponding to a print medium similar to the subject print medium associating the correction data with the subject print medium in a case where the determination unit has determined that the second measurement result should not be obtained.

9. The data processing apparatus according to claim 1, wherein the first measurement result includes lightness information of the region of the subject print medium at which the printing materials are not applied, and the determination unit determines based on a standard deviation of the lightness information.

10. The data processing apparatus according to claim 1 wherein the first measurement result includes chromaticity information of the region of the subject print medium at which the printing materials are not applied, and the determination unit determines based on an average value of the chromaticity information.

11. The data processing apparatus according to claim 1, wherein the first measurement result is Lab value.

12. The data processing apparatus according to claim 11, wherein the determination unit determines that the second measurement result should be obtained in the case where, among the first measurement results, a standard deviation of L values are less than a prescribed threshold value and average L values, average a values, and average b values are less than respectively corresponding threshold values.

13. The data processing apparatus according to claim 9, wherein the determination unit determines that the second color measurement result should be obtained in a case where the standard deviation of the lightness information is below a prescribed threshold value and determines that the second measurement result should not be obtained in a case where the standard deviation of the lightness information is equal to or more than the prescribed threshold value.

14. The data processing apparatus according to claim 1, further comprising a registering unit configured to register a type of print medium that has not been registered previously.

15. The data processing apparatus according to claim 1, further comprising a printing unit configured to apply printing materials to the print medium for printing an image.

16. The data processing apparatus according to claim 1, wherein the first measurement result represents a color of the region of the subject print medium at which the printing materials are not applied and the second measurement result represents a color of the region of the subject print medium at which the printing materials are applied.

17. A data processing method executed by a data processing apparatus, comprising:

- an obtaining step of obtaining a first measurement result by using a measuring unit to measure a region of a subject print medium at which printing materials are not applied; and
- a determination step of determining whether or not a second measurement result should be obtained, based on the first measurement result obtained by the obtaining step,
- wherein a correction data corresponding to the subject print medium is generated based on the second measurement result which is obtained after the first measurement result is obtained by using the measuring unit to measure a region of the subject medium at which the printing materials are applied, and based on a target value corresponding to the region at which the printing materials are applied.

* * * * *